US012681034B2

(12) United States Patent (10) Patent No.: US 12,681,034 B2
Wiebold et al. (45) Date of Patent: Jul. 14, 2026

(54) DUAL-INTERROGATED INTERFEROMETER FOR FLUID MEASUREMENTS

(71) Applicant: Honeywell International Inc., Charlotte, NC (US)

(72) Inventors: Matthew Wiebold, Mankato, MN (US); Thomas Dobbins, Watertown, MN (US)

(73) Assignee: Honeywell International Inc., Charlotte, NC (US)

( * ) Notice: Subject to any disclaimer, the term of this patent is extended or adjusted under 35 U.S.C. 154(b) by 1421 days.

(21) Appl. No.: 17/357,779

(22) Filed: Jun. 24, 2021

(65) Prior Publication Data

US 2022/0137083 A1 May 5, 2022

Related U.S. Application Data

(60) Provisional application No. 63/107,973, filed on Oct. 30, 2020.

(51) Int. Cl.
 *G01P 5/00* (2006.01)
 *G01B 9/02* (2022.01)
 *G01B 11/25* (2006.01)
(52) U.S. Cl.
 CPC .......... *G01P 5/001* (2013.01); *G01B 9/02045* (2013.01); *G01B 11/25* (2013.01)
(58) Field of Classification Search
 CPC ....... G01P 5/001; G01P 5/26; G01B 9/02045; G01B 11/25
 See application file for complete search history.

(56) References Cited

U.S. PATENT DOCUMENTS

| | | | | |
|---|---|---|---|---|
| 4,997,272 A | * | 3/1991 | Dopheide | ................. G01P 5/26 |
| | | | | 356/450 |
| 6,297,878 B1 | * | 10/2001 | Miller | .................... G01S 17/58 |
| | | | | 356/28.5 |

(Continued)

FOREIGN PATENT DOCUMENTS

| | | |
|---|---|---|
| CN | 109001759 A | 12/2018 |
| EP | 2422225 B1 | 7/2015 |

OTHER PUBLICATIONS

Panda, J. "Spectrally-Resolved Rayleigh Scattering to Measure Velocity, Temperature, Density, and Density Fluctuations in High-Speed Flows." Experiments in fluids 61.3 (2020): n. pag. Web. (Year: 2020).*

(Continued)

*Primary Examiner* — Yuqing Xiao
*Assistant Examiner* — Rachel Nguyen
(74) *Attorney, Agent, or Firm* — Fogg & Powers LLC

(57) ABSTRACT

In some embodiments, a system for a dual-interrogated interferometer for fluid measurements includes an interferometer that provides interfered light having interference fringes, wherein the interfered light comprises emitted light from the system interfered with received light by the system. The system also includes a high-rate sensor that detects the interfered light to create high-rate measurements. Further, the system includes a two-dimensional detector array that detects the interfered light to create two-dimensional detector array measurements. Moreover, the system includes one or more processors that calculate fluid velocity in relation to the system based on a mapping of the high-rate measurements to the two-dimensional detector array measurements.

13 Claims, 4 Drawing Sheets

(56)        References Cited

U.S. PATENT DOCUMENTS

| 7,505,145 | B2 | 3/2009 | Hays et al. | |
| 8,107,084 | B2 | 1/2012 | Davidson | |
| 8,797,550 | B2 | 8/2014 | Hays et al. | |
| 8,810,796 | B2 | 8/2014 | Hays et al. | |
| 8,866,322 | B2 | 10/2014 | Tchoryk, Jr. et al. | |
| 9,086,488 | B2 | 7/2015 | Tchoryk, Jr. et al. | |
| 9,285,385 | B2 | 3/2016 | Hanson et al. | |
| 9,977,045 | B2 | 5/2018 | Tchoryk et al. | |
| 10,184,841 | B1 * | 1/2019 | Englert | G01J 9/02 |
| 2007/0046945 | A1 * | 3/2007 | Schwiesow | G01P 5/26 |
| | | | | 356/451 |
| 2011/0164783 | A1 * | 7/2011 | Hays | G01S 17/003 |
| | | | | 356/519 |
| 2015/0002852 | A1 * | 1/2015 | De Groot | G01B 9/0209 |
| | | | | 356/450 |
| 2015/0216415 | A1 * | 8/2015 | Uribe-Patarroyo | |
| | | | | A61B 5/0066 |
| | | | | 356/450 |

OTHER PUBLICATIONS

Panda, J. "Spectrally-Resolved Rayleigh Scattering to Measure Velocity, Temperature, Density, and Density Fluctuations in High-Speed Flows." Experiments in Fluids, vol. 61, No. 3, 2020, https://doi.org/10.1007/s00348-020-2903-2. (Year: 2020).*

Fu et al., "Interferometric Dynamic Measurement: Techniques Based on High-Speed Imaging or a Single Photodetector", The Scientific World Journal, May 12, 2014, pp. 1 through 31, https://www.ncbi.nlm.nih.gov/pmc/articles/PMC4052695/.

Rui et al., "Silicon photomultiplier detector for atmospheric lidar applications", Optics Letters, Apr. 1, 2012, pp. 1229 through 1231, vol. 37, No. 7, Optical Society of America.

Vinogradov, "Evaluation of performance of silicon photomultipliers in LIDAR applications", Photon Counting Applications, at least as early as May 15, 2017, pp. 1 through 11, Proc. of SPIE vol. 10229.

* cited by examiner

DUAL-INTERROGATED INTERFEROMETER FOR FLUID MEASUREMENTS

CROSS REFERENCE TO RELATED APPLICATIONS

This application claims the benefit of U.S. Provisional Patent Application Ser. No. 63/107,973 entitled "DUAL-INTERROGATED INTERFEROMETER FOR WIND MEASUREMENTS" filed on Oct. 30, 2020, which is incorporated herein by reference in its entirety.

BACKGROUND

Many vehicles and systems measure wind speed during operation. Some of these systems measure the wind speed by using light to interrogate the air in the system's environment. For example, a system emits light (like a laser) into the air, where air particles scatter the light, reflecting a portion of the light back to the system. Upon receiving and detecting the light, the system identifies a Doppler frequency shift between the emitted light and the received light by interfering the emitted light with the received light and identifying interference patterns. The system uses the identified Doppler frequency shift to calculate wind speed.

SUMMARY

Systems and methods for a dual-interrogated interferometer for fluid measurements are described herein. In some embodiments, a system includes an interferometer that provides interfered light having interference fringes, wherein the interfered light comprises emitted light from the system interfered with received light by the system. The system also includes a high-rate sensor that detects the interfered light to create high-rate measurements. Further, the system includes a two-dimensional detector array that detects the interfered light to create two-dimensional detector array measurements. Moreover, the system includes one or more processors that calculate fluid velocity in relation to the system based on a mapping of the high-rate measurements to the two-dimensional detector array measurements.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1:
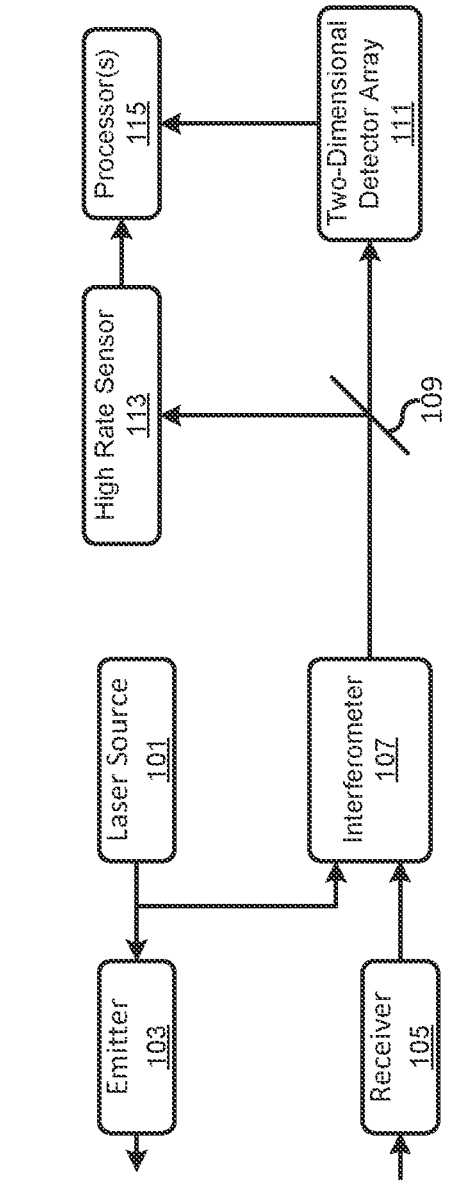
FIG. 1 is a block diagram illustrating exemplary embodiments of a system using a dual-interrogated interferometer to measure fluid velocities according to an aspect of the present disclosure.

Under common practice, the various described features are not drawn to scale but are drawn to emphasize specific features relevant to the example embodiments.

DETAILED DESCRIPTION

In the following detailed description, reference is made to the accompanying drawings that form a part of the present description, and in which is shown, through illustration, specific illustrative embodiments. However, it is to be understood that other embodiments may be used and that logical, mechanical, and electrical changes may be made.

The present disclosure describes systems and methods for a dual-interrogated interferometer for fluid measurements. For example, a system may emit light into a fluid like air or water. Particles within the fluid may reflect the emitted light. When the fluid is moving relative to the system, the relative movement of the fluid may cause a Doppler shift in the frequency in the light received by the system. Accordingly, the system can measure the Doppler shift by comparing interference fringes created individually by interfering the outgoing (reference) light with the Doppler-shifted returned light.

Some systems include a two-dimensional detector array (i.e., camera or other array) for detecting the light passing through the interferometer. The two-dimensional detector array may generate an electrical signal based on the detected light and provide the electrical signals to a processor. Then, the processor uses the electrical signals to determine the Doppler shift between the emitted light and the received light. The processor uses the determined Doppler shift to calculate the velocity of the fluid relative to the system. While a two-dimensional detector array offers a spatial and temporal range that can measure fluid velocities at a wide range of distances and conditions, the spatial and temporal range comes at the cost of signal dynamic range. As such, the limited signal dynamic range may limit the spatial resolution and the maximum range associated with resultant fluid measurements.

Systems described herein include an additional sensor that provides lower noise measurements at a faster read rate. However, to provide lower noise measurements and faster read rates, the additional sensor has a smaller dynamic range and receives measurements across fewer pixels when compared to the two-dimensional detector array. Thus, the system combines the additional high-rate sensor measurements and the measurements from the two-dimensional detector array to improve the spatial resolution and increase the maximum range associated with potential measurements. For example, the system combines the measurements by mapping the high-rate sensor data onto the two-dimensional detector array information. The processor then determines the fluid measurements based on where the high-rate sensor measurements map to the two-dimensional detector array information. The system uses the mapping to determine fluid measurements at an increased rate, yielding a higher spatial resolution. The lower noise floor of the high-rate sensor also allows the fluid measurement to be made at lower signal levels, increasing the upper range for the measurement distance. Thus, the system may improve fluid measurement accuracy and maximum range of measurements.

FIG. 1 is a block diagram of a system 100 for measuring fluid velocity using a dual-interrogated interferometer. The system 100 may include a laser source 101. The laser source 101 may be a monochromatic laser source or other type of laser source. The laser source 101 may provide light in the ultraviolet, visible, near-infrared, or other light range. Additionally, the system 100 includes an emitter 103 to emit the light from the laser source 101 into the environment of the system 100. The emitter 103 is a series of optics (optical fibers, gratings, waveguides, mirrors, lenses, etc.) that direct the laser source into the environment of the system 100. Further, the system 100 couples light produced by the laser source 101 into an interferometer 107.

In exemplary embodiments, the system 100 may also include a receiver 105 for receiving light reflected by particles in the environment of the system 100. Like the emitter 103, the receiver 105 is a series of optics, but instead of emitting light, the optics of the receiver 105 receive the reflected light. The interferometer 107 is also coupled to the receiver 105 and receives the reflected light from the receiver 105. Because the interferometer 107 receives light from the receiver 105 and the laser source 101, the interferometer 107 beats the received light from the receiver 105 against the light from the laser source 101. The interferometer 107 provides the resultant beat pattern for detection by additional sensors in the system 100.

In some embodiments, the system 100 includes a splitter 109. The splitter 109 may couple the light received from the interferometer 107 to a high-rate sensor 113 and a two-dimensional detector array 111. The splitter 109 may be a partially reflective mirror, a coupler, or another device capable of receiving light on a single input and coupling the received light into two separate output paths (i.e., a first output path and a second output path). One of the first and second output paths is coupled to the two-dimensional detector array 111. The two-dimensional detector array 111 may be a charge-coupled device (CCD) camera, such as an electron-multiplying charge-coupled device (EMCCD) camera. The two-dimensional detector array 111 has a sufficiently large dynamic range. As described herein, a sufficiently large dynamic range encompasses the frequencies associated with the emitted light and the frequencies associated with the received shifted light. The two-dimensional detector array 111 may be a type of camera that provides similar functionality and capabilities as a CCD or EMCCD camera. While a two-dimensional detector array 111 is used to provide sufficiently large dynamic range measurements, other types of sensors that also provide a sufficiently large dynamic range can also be used.

In additional embodiments, the high-rate sensor 113 detects information from the light from the interferometer 107 at a higher rate than the two-dimensional detector array 111. However, the high-rate sensor 113 may detect the light from the interferometer 107 at a smaller number of detectors or pixels and have a lower dynamic range than the two-dimensional detector array 111. In some embodiments, the high-rate sensor 113 may be a photomultiplier tube (PMT) array. As used herein, a PMT array may refer to an array of photomultiplier tubes that detect the light transmitted to the high-rate sensor 113 from one of the first and second output paths from the splitter 109. The high-rate sensor 113 and the two-dimensional detector array 111 may provide electrical signals representing the interfered light to a processor 115.

In certain embodiments, the processor 115 analyzes the electrical signals from the two-dimensional detector array 111 and the high-rate sensor 113 to determine estimates for fluid velocity measurements (wind speed and the like) or the measurements of other fluid characteristics. To determine the estimates of fluid velocity, the processor 115 performs fringe fitting of both the data from the two-dimensional detector array 111 and the data from the high-rate sensor 113. The processor 115 then identifies transmit measurements from the two-dimensional detector array 111 associated with the transmitted light from the laser source 101. Also, the processor 115 identifies receive measurements from the two-dimensional detector array 111 associated with the light received through the receiver 105. The processor may identify the fluid velocity by identifying a phase shift between the receive measurements and the transmit measurements. However, as described above, measurements based on data from the two-dimensional detector array 111 may be limited because of the limited read rate of the two-dimensional detector array 111.

In some embodiments, to increase the read rate of the system 100, for each high-rate measurement received from the high-rate sensor 113, the processor 115 identifies a mapping of the high-rate measurements to the receive measurements from the two-dimensional detector array 111. The processor 115 uses the mapping to identify a phase shift of the high-rate measurements in relation to the transmit measurements. Moreover, the processor 115 uses the identified phase shift to calculate a fluid velocity. As the processor 115 receives high-rate measurements from the high-rate sensor 113 more often than the two-dimensional detector array 111, the processor 115 can calculate fluid velocity with an increased resolution. Additionally, as the processor 115 calculates fluid velocity separately for both the high-rate sensor 113 and the two-dimensional detector array 111, the processor 115 may fuse the fluid velocity measurement derived from the high-rate measurements with the fluid velocity measurements derived from the two-dimensional detector array 111. Alternatively, the processor 115 may solely use the measurement from the high-rate sensor 113. As the high-rate sensor 113 provides measurements at a greater rate, the processor 115 may produce fluid measurements with increased spatial resolution and less noise. The smaller noise floor allows the calculation of fluid measurements at greater altitudes.

The processor 115 or other computational device(s) may be implemented using software, firmware, hardware, or other appropriate combinations thereof. The processor 115 and/or other computational devices may be supplemented by, or incorporated in, specially designed application-specific integrated circuits (ASICs) or field programmable gate arrays (FPGAs). The processor 115 may be a general or special purpose computer or processor, or other programmable logic devices. The processor 115 and other computation devices may also include or function with software programs, firmware, or other computer-readable instructions for carrying out various process tasks, calculations, and control functions used in the present methods and systems.

Further, computer-executable instructions (such as program modules or components) may implement the methods described in this description. At least one processor may execute the computer-executable instructions. Software, firmware, or other execution-capable devices may execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a media that stores data that the processor or other computing device can access. In certain implementations, the computer-readable medium may form part of a memory unit.

Computer-readable mediums may include non-volatile memory devices. Non-volatile memory devices may include semiconductor memory devices such as random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

Figure 2:
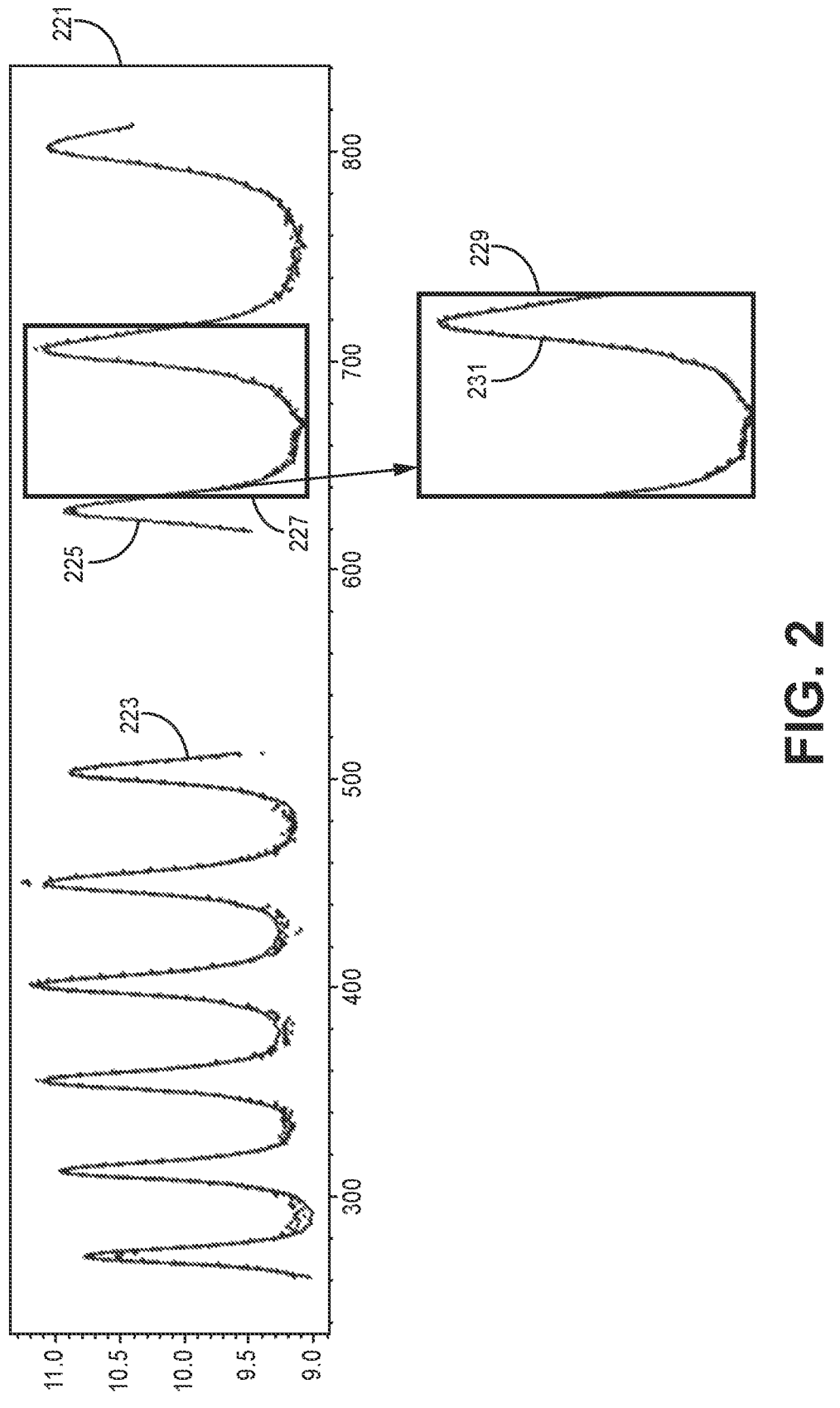
FIG. 2 is a diagram illustrating the detection and mapping of fringe patterns to measure fluid velocities according to an aspect of the present disclosure.

FIG. 2 illustrates the mapping 227 of high-rate measurements 229 from the high-rate sensor 113 to the two-dimensional detector array measurements 221 from the two-dimensional detector array 111. As shown, the processor 115 may perform fringe fitting on both the two-dimensional detector array measurements 221 and the high-rate measurements 229. From the fitted fringes, the processor 115 may identify a receive fringe 225 for the most recent receive measurements in the two-dimensional detector array measurements 221 and a transmit fringe 223 for the most recent transmit measurements in the two-dimensional detector array measurements 221. Further, the processor 115 may identify a high-rate fringe 231 for the most recent high-rate measurements 229.

In certain embodiments, when the processor 115 has identified the receive fringe 225 and the high-rate fringe 231, the processor 115 may identify a mapping 227 of the receive fringe 225 to the high-rate fringe 231. As described above, the mapping 227 identifies the spectral range of the receive fringe 225, where the portion of the receive fringe 225 within the spectral range most closely resembles the data in the high-rate fringe 231. For example, as shown in FIG. 2, the processor 115 may determine that the receive fringe within the two-dimensional detector array pixel range of 637-725 pixels most closely resembles the high-rate fringe 231. Thus, the processor 115 may determine that the identified spectral range maps to the high-rate fringe 231. The processor 115 determines which portion of the receive fringe 225 most closely resembles the high-rate fringe 231 by performing a statistical comparison of the data associated with the receive fringe 225 and the high-rate fringe 231. For example, the statistical comparison may be a correlation, divergence, or other statistical comparison between the receive fringe 225 and the high-rate fringe 231.

As described above, the processor 115 may use fringe fitting, interpolation, or other mathematical adjustments to the data to facilitate the comparisons between the two-dimensional detector array measurements 221 and the high-rate measurements 229 because the two-dimensional detector array 111 provides measurements with increased resolution than the measurements provided by the high-rate sensor 113. However, in some embodiments, the processor 115 may directly map the high-rate measurements 229 to the two-dimensional detector array measurements 221 using numerical methods other than fringe fitting.

In additional embodiments, when the processor 115 has identified the mapping 227, the processor 115 may identify the phase difference between the receive fringe 225 within the spectral range of the mapping 227 and the phase of the transmit fringe 223. The processor 115 may then calculate the fluid velocity based on the Doppler shift associated with the phase difference.

Figures 3A, 3B:
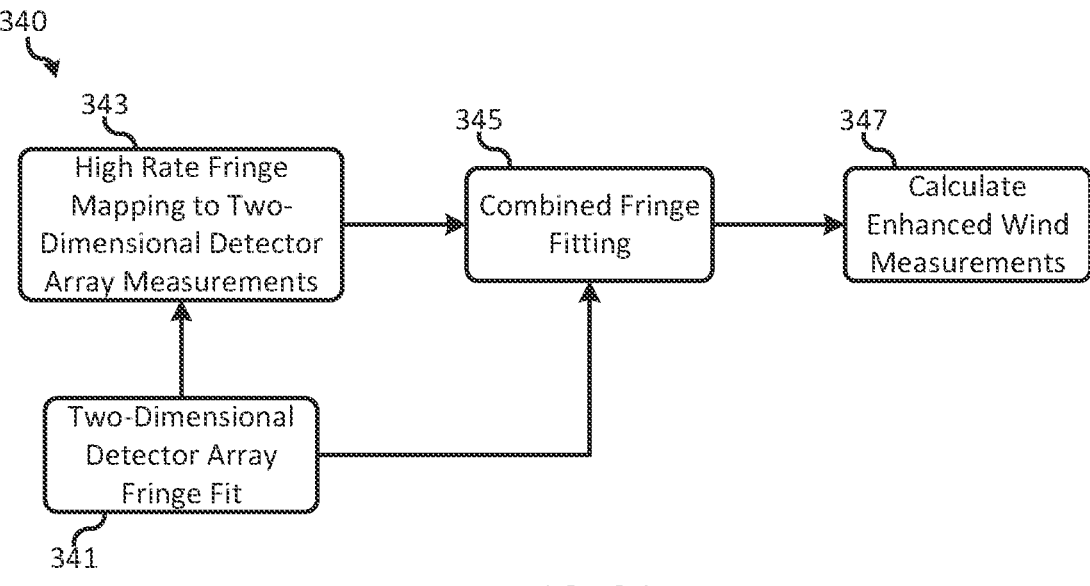
FIGS. 3A and 3B are flowchart diagrams of methods for calculating fluid measurements using multiple sensors according to an aspect of the present disclosure.

FIGS. 3A-3B illustrate various methods for using measurements from a two-dimensional detector array (such as the two-dimensional detector array 111 in FIG. 1) and a high-rate sensor (such as the high-rate sensor 113). The methods may provide enhanced fluid measurements based on measurements by the two-dimensional detector array and the high-rate sensor of detected light from an interferometer. Specifically, FIG. 3A is a flowchart diagram of a method 340 for calculating enhanced fluid measurements from measurements from the two-dimensional detector array and the high-rate sensor. The method 340 proceeds at 341, where a processor performs a fringe fit on the two-dimensional detector array data. Further, the method 340 then proceeds to 343, where a processor performs a fringe mapping of the high-rate sensor measurements to the two-dimensional detector array measurements. Accordingly, the processor may determine a frequency shift from both the high-rate sensor measurements and the two-dimensional detector array measurements.

In some embodiments, the method 340 proceeds at 345, where the processor combines the fringe mapping information of the high-rate sensor measurements with the two-dimensional detector array fringe-fitting information. Then, the method 340 proceeds at 347, by calculating enhanced fluid measurements from the combined fringe fitting. For example, the processor may average the different measurements, use a Kalman filter (or other type of filtering), or other mathematical methods to combine different measurements.

Alternatively, FIG. 3B is a flowchart diagram of a method 350 for calculating enhanced fluid measurements from the high-rate sensor measurements. As shown, the method 350 proceeds at 351, where a processor performs a fringe fit on the two-dimensional detector array data. Additionally, the method 350 proceeds to 353, where a processor performs a fringe mapping of the high-rate sensor measurements to the two-dimensional detector array measurements. Further, the method 350 proceeds at 355, where the processor calculates the enhanced fluid measurements from the high-rate fringe mapping to two-dimensional detector array measurements.

Figure 4:
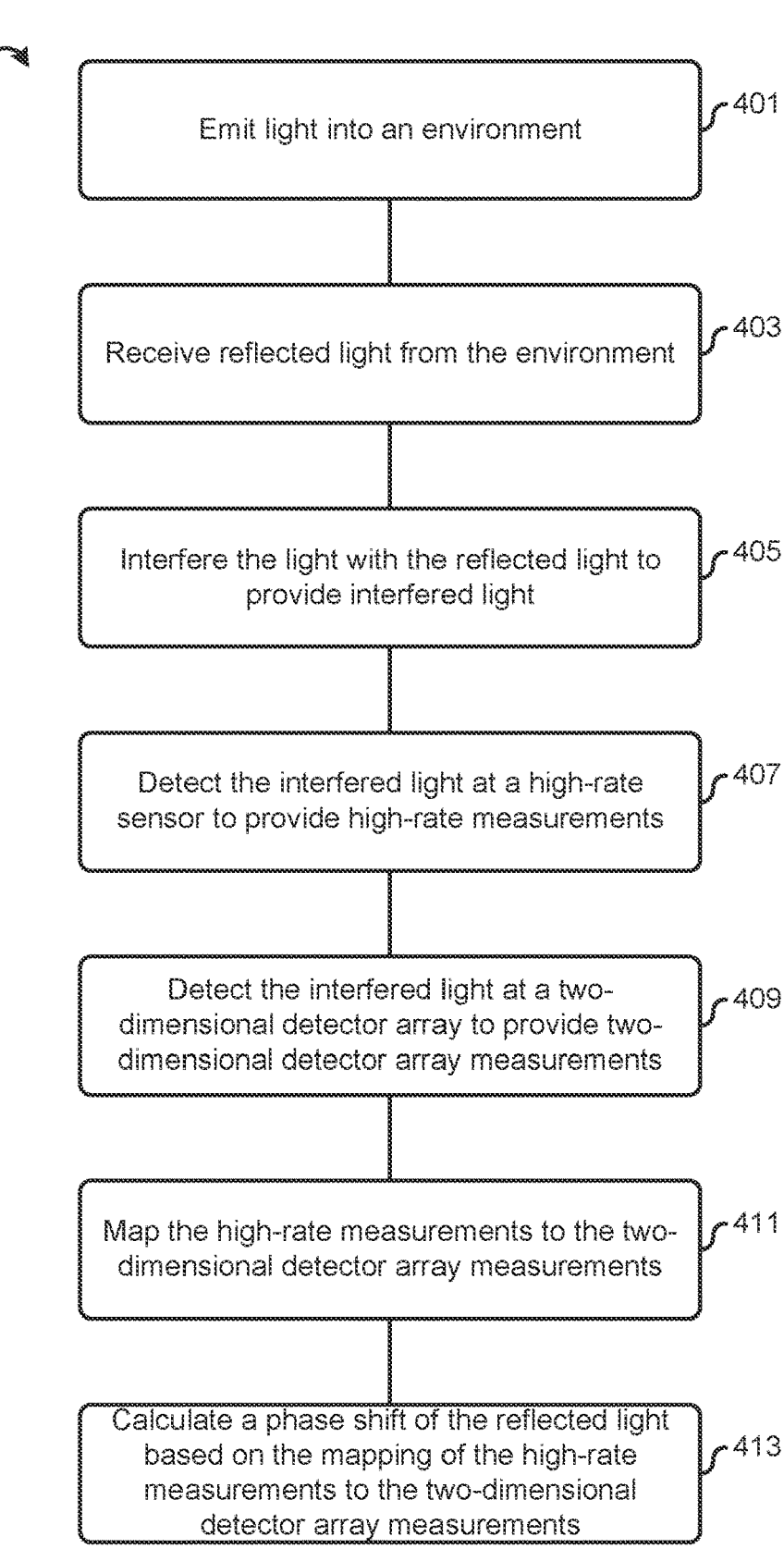
FIG. 4 is a flowchart diagram of a method for using a dual-interrogated interferometer for fluid measurements according to an aspect of the present disclosure.

FIG. 4 is a flowchart diagram of a method 400 for dual-interrogated interferometer for fluid measurements. The method 400 proceeds at 401, where light is emitted into an environment. Further, the method 400 proceeds at 403, where reflected light is received from the environment. Also, the method 400 proceeds at 405, where the light is interfered with the reflected light to provide interfered light.

In certain embodiments, the method 400 proceeds at 407, where the interfered light is detected at a high-rate sensor to provide high-rate measurements. Also, the method 400 proceeds at 409, where the interfered light is detected at a two-dimensional detector array to provide two-dimensional detector array measurements. Further, the method 400 proceeds at 411, where the high-rate measurements are mapped to the two-dimensional detector array measurements. Moreover, the method 400 proceeds at 413, where a phase shift of the reflected light is calculated based on the mapping of the high-rate measurements to the two-dimensional detector array measurements.

Example Embodiments

Example 1 includes a system comprising: an interferometer that provides interfered light having interference fringes, wherein the interfered light comprises emitted light from the system interfered with received light by the system; a high-rate sensor that detects the interfered light to create high-rate measurements; a two-dimensional detector array that detects the interfered light to create two-dimensional detector array measurements; and one or more processors that calculate fluid velocity in relation to the system based on a mapping of the high-rate measurements to the two-dimensional detector array measurements.

Example 2 includes the system of Example 1, wherein the one or more processors calculate the fluid velocity based on a phase shift of the received light with respect to the emitted light, wherein the one or more processors identifies the phase shift by mapping a fringe for the high-rate measurements to a corresponding fringe for the two-dimensional detector array measurements and identifies the phase shift between the mapped fringe and a fringe associated with the emitted light in the two-dimensional detector array measurements.

Example 3 includes the system of any of Examples 1-2, wherein the two-dimensional detector array is a charge-coupled device.

Example 4 includes the system of any of Examples 1-3, wherein the high-rate sensor detects the interfered light at a smaller number of detectors compared to the two-dimensional detector array and has a lower dynamic range than the two-dimensional detector array.

Example 5 includes the system of Example 4, wherein the high-rate sensor is a photomultiplier tube array.

Example 6 includes the system of any of Examples 1-5, wherein the one or more processors performs fringe fitting when mapping the high-rate measurements to the two-dimensional detector array measurements.

Example 7 includes the system of any of Examples 1-6, wherein the one or more processors fuse the fluid velocity calculated from the high-rate measurements with the fluid velocity calculated from the two-dimensional detector array.

Example 8 includes the system of any of Examples 1-7, wherein the one or more processors provide the fluid velocity calculated from the high-rate measurements.

Example 9 includes the system of any of Examples 1-8, wherein the one or more processors provide the fluid velocity calculated separately from both the high-rate measurements and the two-dimensional detector array measurements.

Example 10 includes a method comprising: emitting light into an environment; receiving reflected light from the environment; interfering the light with the reflected light to provide interfered light; detecting the interfered light at a high-rate sensor, the high-rate sensor providing high-rate measurements; detecting the interfered light at a two-dimensional detector array, the two-dimensional detector array providing two-dimensional detector array measurements; mapping the high-rate measurements to the two-dimensional detector array measurements; and calculating a phase shift of the reflected light based on the mapping of the high-rate measurements to the two-dimensional detector array measurements.

Example 11 includes the method of Example 10, wherein mapping the high-rate measurements to the two-dimensional detector array measurements comprises mapping a fringe for the high-rate measurements to a corresponding fringe for the two-dimensional detector array measurements.

Example 12 includes the method of any of Examples 10-11, wherein the two-dimensional detector array is a charge-coupled device.

Example 13 includes the method of any of Examples 10-12, wherein detecting the interfered light at the high-rate sensor comprises detecting the interfered light at a smaller number of detectors compared to the two-dimensional detector array and at a lower dynamic range than the two-dimensional detector array.

Example 14 includes the method of any of Examples 10-13, wherein the high-rate sensor is a photomultiplier tube array.

Example 15 includes the method of any of Examples 10-14, wherein mapping the high-rate measurements to the two-dimensional detector array measurements comprises performing a fringe fitting on the high-rate measurements to the two-dimensional detector array measurements.

Example 16 includes the method of any of Examples 10-15, further comprising calculating a fluid velocity of a fluid in the environment based on the phase shift.

Example 17 includes the method of Example 16, further comprising fusing the fluid velocity calculated from the high-rate measurements with the fluid velocity calculated from the two-dimensional detector array measurements.

Example 18 includes the method of any of Examples 16-17, further comprising providing the fluid velocity calculated from at least one of the high-rate measurements and the two-dimensional detector array measurements.

Example 19 includes a system comprising: a laser source that generates light; an emitter that emits the light into an environment of the system; a receiver that receives reflected light, where the reflected light is the light reflected by particles in the environment; an interferometer that produces interfered light by interfering the light with the reflected light to create interference fringes; a coupler that couples the interfered light onto a first output path and a second output path; a first sensor coupled to the first output path that provides a first set of measurements of the interfered light; a second sensor coupled to the second output path that provides a second set of measurements of the interfered light, wherein the first sensor has a smaller number of detectors and a lower dynamic range than the second sensor; and one or more processors that calculate fluid velocity in relation to the system based on a mapping of the first set of measurements to the second set of measurements.

Example 20 includes the system of Example 19, wherein the first sensor is a photomultiplier tube array and the second sensor is a two-dimensional detector array.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:

an interferometer that provides interfered light having interference fringes, wherein the interfered light comprises emitted light from the system interfered with received light by the system;

a high-rate sensor that detects the interfered light to create high-rate measurements;

a two-dimensional detector array that detects the interfered light to create two-dimensional detector array measurements; and one or more processors that calculate fluid velocity in relation to the system, wherein the one or more processors are configured to:

identify a receive fringe for the two-dimensional detector array measurements;

identify a high-rate fringe for the high-rate measurements;

perform a statistical comparison of the receive fringe, wherein the statistical comparison identifies a portion of the receive fringe that most closely resembles the high-rate fringe;

identify a phase difference between the portion of the receive fringe and a transmit fringe associated with the emitted light from the system; and calculate the fluid velocity associated with the phase difference.

2. The system of claim 1, wherein the two-dimensional detector array is a charge-coupled device.

3. The system of claim 1, wherein the high-rate sensor detects the interfered light at a smaller number of detectors compared to the two-dimensional detector array and has a lower dynamic range than the two-dimensional detector array.

4. The system of claim 3, wherein the high-rate sensor is a photomultiplier tube array.

5. The system of claim 1, wherein the one or more processors provide fluid velocity calculated from the high-rate measurements.

6. The system of claim 1, wherein the one or more processors provide fluid velocity calculated separately from both the high-rate measurements and the two-dimensional detector array measurements.

7. A method comprising:

emitting light into an environment;

receiving reflected light from the environment;

interfering the light with the reflected light to provide interfered light;

detecting the interfered light at a high-rate sensor, the high-rate sensor providing high-rate measurements;

detecting the interfered light at a two-dimensional detector array, the two-dimensional detector array providing two-dimensional detector array measurements;

perform a statistical comparison of the two-dimensional detector array measurements to the high-rate measurements, wherein the statistical comparison identifies the portion of the two-dimensional detector array measurements that most closely resembles the high-rate fringe; and calculating a phase shift of the reflected light based on the portion of the two-dimensional detector array measurements; and calculate a fluid velocity associated with the phase shift.

8. The method of claim 7, wherein the two-dimensional detector array is a charge-coupled device.

9. The method of claim 7, wherein detecting the interfered light at the high-rate sensor comprises detecting the interfered light at a smaller number of detectors compared to the two-dimensional detector array and at a lower dynamic range than the two-dimensional detector array.

10. The method of claim 7, wherein the high-rate sensor is a photomultiplier tube array.

11. The method of claim 7, further comprising providing fluid velocity calculated from at least one of the high-rate measurements and the two-dimensional detector array measurements.

12. A system comprising:

a laser source that generates light;

an emitter that emits the light into an environment of the system;

a receiver that receives reflected light, where the reflected light is the light reflected by particles in the environment;

an interferometer that produces interfered light by interfering the light with the reflected light to create interference fringes;

a coupler that couples the interfered light onto a first output path and a second output path;

a first sensor coupled to the first output path that provides a first set of measurements of the interfered light;

a second sensor coupled to the second output path that provides a second set of measurements of the interfered light, wherein the first sensor has a smaller number of detectors and a lower dynamic range than the second sensor; and one or more processors that calculate fluid velocity in relation to the system wherein the one or more processors are configured to:

identify a receive fringe for the second set of measurements;

identify a high-rate fringe for the first set of measurements;

perform a statistical comparison of the receive fringe, wherein the statistical comparison identifies a portion of the receive fringe that most closely resembles the high-rate fringe;

identify a phase difference between the portion of the receive fringe and a transmit fringe associated with the emitted light from the system; and calculate the fluid velocity associated with the phase difference.

13. The system of claim 12, wherein the first sensor is a photomultiplier tube array and the second sensor is a two-dimensional detector array.

* * * * *